United States Patent

Kramer

Patent Number: 5,420,498
Date of Patent: May 30, 1995

[54] CIRCUIT ARRANGEMENT FOR GENERATING A CONSTANT OUTPUT VOLTAGE

[75] Inventor: Karl-Heinz Kramer, Geretsried, Germany

[73] Assignee: Siemens Aktiengesellschaft, Munich, Germany

[21] Appl. No.: 95,768

[22] Filed: Jul. 23, 1993

[30] Foreign Application Priority Data

Aug. 20, 1992 [EP] European Pat. Off. ............ 92114237

[51] Int. Cl.⁶ .............................................. G05F 1/63
[52] U.S. Cl. ................................. 323/293; 323/902; 307/64; 307/82
[58] Field of Search ............... 307/64, 82; 323/271, 323/293, 902

[56] References Cited

U.S. PATENT DOCUMENTS

| | | | |
|---|---|---|---|
| 3,890,559 | 6/1975 | Kuster | 323/280 |
| 4,035,716 | 7/1977 | Hutchinson | 307/82 |
| 4,074,182 | 2/1978 | Weischedel | 323/269 |
| 4,177,389 | 12/1979 | Schott | 307/64 |
| 4,884,160 | 11/1989 | Pasquarella | 361/18 |

Primary Examiner—Thomas M. Dougherty
Assistant Examiner—Adolf Berhane
Attorney, Agent, or Firm—Hill, Steadman & Simpson

[57] ABSTRACT

A circuit arrangement for generating a constant output voltage has a decoupling diode at the output side and has a circuit for actual value formation that is connected to the output of the circuit arrangement. In order, given high precision of the output voltage, to prevent voltages appearing at the user and applied in some other way to the user from causing the regulator to inhibit the circuit arrangement, a reference potential terminal of the regulator lies at one side of the decoupling diode and the voltage divider lies at the other side of the decoupling diode. The circuit arrangement is particularly suited for redundant feed of equipment in electrical communications transmission technology.

5 Claims, 1 Drawing Sheet

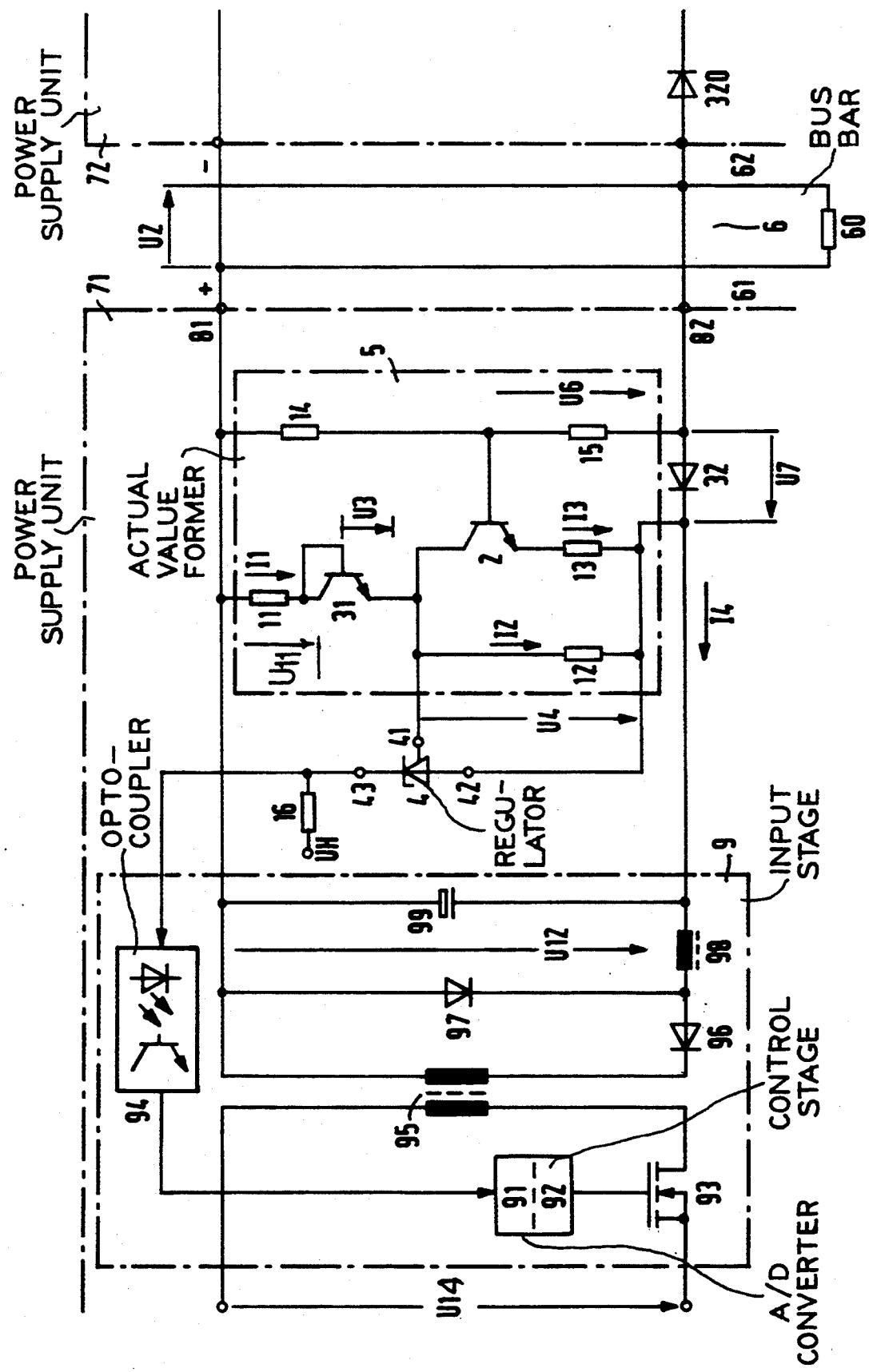

CIRCUIT ARRANGEMENT FOR GENERATING A CONSTANT OUTPUT VOLTAGE

BACKGROUND OF THE INVENTION

1. Field of the Invention

The present invention is directed to a circuit arrangement for generating a d.c. output voltage regulated to a constant value.

2. Description of the Prior Art

U.S. Pat. No. 3,890,559 discloses a circuit arrangement for generating a constant output voltage wherein two identical frequency converters feed a common load via decoupling diodes. Each of the two frequency converters is capable of supplying the load by itself. The frequency converters each comprise a regulator for regulating the output voltage to a constant value. The voltage regulator operates so that the deviation of an actual value voltage, generated by an arrangement for forming an actual value from a reference voltage, is minimized as far as possible. The regulator is composed of a differential amplifier having two emitter-coupled transistors and having a further transistor connected thereto. In the differential amplifier, the base of one transistor is connected to the tap of an ohmic voltage divider that lies at the load resistor to be supplied. The base of the other of the two transistors of the differential amplifier is connected to the tap of a voltage divider that contains a Zener diode as the reference voltage source.

The reference potential terminal of the regulator in this known circuit is directly connected to the load resistor. If a voltage arose at the load resistor comparable in size and applied in some other way to the user such as derived from another, identical power supply this would substantially completely block the frequency converter so that it would not be capable of feeding the load resistor in an adequately short time as warranted. An auxiliary circuit composed of a transistor, of a voltage divider and a further Zener diode therefore can assume the control, and then insures that a prescribed value of the output current is not downwardly transgressed. The transistor lying at the output of the differential amplifier, an optocoupler and the auxiliary circuit are matched such to one another in view of their temperature coefficients such that temperature-conditioned changes act opposite one another.

The arrangement which forms the actual value can also be fashioned such that the actual value for the regulator is formed as a mixed value of the voltage preceding and following the decoupling diode. When a low tolerance of the output voltage is required, then the part of the voltage following the decoupling diode must predominate. In this case, however, the power supply that becomes active first blocks the other. When the mixing ratio of the measured values preceding and following the decoupling diode is only selected as 1:1 in order to avoid this problem, then only a limited precision of the user voltage can be achieved, since the voltage drop at the decoupling diode is greatly dependent on the temperature and on the load current.

SUMMARY OF THE INVENTION

It is an object of the present invention to provide a circuit arrangement for generating a constant output voltage from which an electrical user can be supplied via a decoupling diode such that, given comparatively high precision of the voltage to be made available, voltages applied to the user in some other way do not cause the regulator to block the circuit arrangement.

The above object is achieved in accordance with the principles of the present invention in a circuit arrangement for generating a d.c. voltage regulated to a constant value having two output terminals to which a load, such an electrical user and/or the output of an identical circuit arrangement can be connected, the circuit arrangement itself having a decoupling diode in one of the two current paths leading to the output terminals, and a regulator connected to an actual value forming circuit. The actual value forming circuit contains an ohmic voltage divider connected across the output terminals, and the regulator at least approximately eliminates deviations of the actual value voltage supplied thereby from a reference voltage. The decoupling diode is connected between a reference potential terminal of the regulator and one of the output terminals, and the actual value former further contains a parallel circuit having one branch containing a resistor and another branch containing a series connection of the emitter-collector path of a transistor and a further resistor. This parallel circuit is connected between an actual value voltage input of the regulator and the reference potential terminal of the regulator. The base of the aforementioned transistor is connected to a tap of the voltage divider. A series circuit formed by a resistor and an additional diode, polarized in the conducting direction with reference to the output voltage, is connected between the actual value voltage input of the regulator and the other output terminal.

The ohmic voltage divider lying between the output terminals of the circuit arrangement can be directly connected to the output terminals or, via a separate test line, can be directly connected to the electrical user to be supplied, i.e. can be indirectly connected to the output terminals of the circuit arrangement via a connecting line leading to the user. The circuit arrangement can initially serve by itself for feeding the electrical user.

Such an arrangement is suitable for being supplemented without special measures by a further, identical circuit arrangement, so that an apparatus for the redundant supply of the user is achieved.

The inventive measures yield a circuit arrangement suitable for redundant feed having a decoupling diode that, given comparatively high precision of the constant voltage that is generated, guarantees a decoupling of the regulator from voltages applied to the user in some other way. A further advantage is that temperature compensation over a wide temperature change can be achieved for the decoupling diode as well as for the arrangement for forming the actual value.

DESCRIPTION OF THE DRAWINGS

The single FIGURE shows an apparatus for redundant feed of an electrical user via two decoupling diodes constructed in accordance with the principles of the present invention.

DESCRIPTION OF THE PREFERRED EMBODIMENTS

In the apparatus shown in the FIGURE, the electrical user 60 lies at busbar (or bus line) 6. The busbar 6 is across to the outputs of two power supply units 71 and 72. Both power supply units 71 and 72 are capable of feeding the user 60 by themselves. A redundant power supply for the user 60 is achieved in this way.

The main circuits of the power supply units 71 and 72 each respectively contain decoupling diodes 32 and 320 in the feed current path leading to the negative pole 62 of the busbar 6. The two power supply units 71 and 72 are constructed in the same way. Further details thereof are therefore shown in the figure for only one of the two power supply units, namely for the power supply unit 71.

The main circuit of the input side proceeds, in an input stage 9, from the input for the d.c. voltage U14 via the primary winding of a transformer 95 and a power switch 93 in series therewith, which is the actuator of the controlled system. The main circuit of the output side proceeds through the output terminal 81 via the secondary winding of the transformer 95, a rectifier diode 96, an inductor 98 and the decoupling diode 32 to the output terminal 82. A free running diode 97 is arranged in a shunt arm that follows the rectifier diode 96. A storage capacitor 99 at which the d.c. voltage U-12 is present is located in a shunt arm following the inductor 98.

The main circuit of the output side of the power supply unit 71 is thus directly connected to the output terminal 81 and, via the decoupling diode 32, to the output terminal 82. The decoupling 32 has its anode at the output terminal 82. The busbar 6 and/or the power supply unit 72 thus represent a Icad connectable across the output terminals 81 and 82 of the power supply unit 71.

The regulator 4 is a commercially available, integrated circuit, for example type TL 431 of Motorola. Such a regulator has a reference voltage terminal 42, an actual value input 41 and an adjustment voltage output 43.

The regulator 4 contains a reference voltage source and supplies the adjustment voltage U3 at the adjustment voltage output 43. The adjustment voltage output 43 is connected to the auxiliary voltage $U_H$ via the resistor 16. The adjustment voltage output 43 of the regulator 4 is conducted via an octoccupier 94 to an analog-to-digital converter 91 that is followed by a control stage 92 for controlling the power switch 93.

An actual value former 5 contains a voltage divider composed of resistors 14 and 15 that lies between the output terminals 81 and 82 and has a tap 85. The actual value former 5 contains an active arrangement having three current branches wherein the currents I1, I2 and I3 flow in addition to the ohmic voltage divider.

The first current branch, wherein the current I1 flows, is composed of the ohmic resistor 11 and of the diode 31 arranged in series therewith. The diode 31 is an npn transistor whose emitter and collector are directly connected to one another. The diode 31 is thereby polarized such that it is polarized in conducting direction with reference to the output voltage U2. The series circuit composed of the resistor 11 and the diode 31 is arranged between the output terminal 81 of the power supply unit 71 and the actual value input 41 of the regulator 4.

The second current branch, wherein the current I2 flows, is composed of the resistor 12 and lies between the actual value input 41 of the regulator 4 and the cathode of the decoupling diode 32. The third current branch, wherein the current I3 flows, is composed of the emitter-collector path of the transistor 2 and resistor 13 arranged in series therewith. The collector of the transistor 2 is directly connected to the actual value input of the regulator 4. The resistor 13 lies between the emitter of the transistor 2 and the cathode of the decoupling diode 32. The base of the transistor 2 is connected to the tap 85 of the ohmic voltage divider formed by resistors 14 and 15.

The output current 14 flows in the main circuit of the output side of the power supply unit 71.

The respective current paths of the main circuits of the power supply units 71 and 72 that lead to the positive pole 61 of the busbar 6 each contain a decoupling diode. The decoupling diode 32 and 320 lie in the current paths of the main circuits of the output side that lead to the negative pole 62 of the busbar. A relatively low d.c. voltage having high precision, for example a voltage of 4.8 volts of a tolerance of 2%, is across busbar 6. This output voltage U2 is a voltage that is negative with reference to the positive pole lying at reference potential.

Given optimum dimensioning, the actual value former 5 completely eliminates the influence that the voltage drop occurring at the decoupling diode 32 could have on the output voltage U2 to be kept constant.

The regulator 4 is a three-pole integrated circuit that functions like an operational amplifier having an integrated reference voltage source with a high-stability reference voltage of, for example, 2.49 volts. With regard to its reference point, it only processes positive measured values. This is taken into consideration by virtue of the cathode of the decoupling diode forming the reference point for the regulator 4, whereas the positive pole of the output voltage U2 of the power supply unit 71 lying at the output terminal 81 corresponds to the potential +0 volts and lies at ground.

A part of the output voltage U2 is taken at the tap 85 of the ohmic voltage divider formed by resistors 14 and 15 and is supplied to the base of the transistor. The transistor 2 functions as a current sink for the current I3 and is arranged in a common emitter arrangement. The current I2 flows from the actual value input 41 of the regulator 4 through the resistor 12 to the reference voltage terminal 42 of the regulator 4. The aggregate current I1=I2+I3 flows from the 0 volt bar 61 through the resistor 13 to the actual value input 41 of the regulator 4. The voltage U4 at the actual value input 41 of the regulator 4 is established by the voltage drop at the resistor 12 and amounts to U4=I2*R12.

This voltage U4 is supplied to the actual value voltage input 41 of the regulator 4. The regulator regulates the output voltage U2 of the power supply unit 71 such that the voltage U4 is equal to the internal reference voltage $U_{Ref}$ of the regulator 4.

The following circuit analysis demonstrates that the circuit arrangement shown in the FIGURE has the property that the output voltage U2 can be made independent of the voltage drop U7 of the decoupling diode 32.

Denoted in the formulas are:
R11=the value of the resistor 11,
R12=the value of the resistor 12,
R13=the value of the resistor 13,
U1=the voltage between output terminal 81 and cathode of the decoupling diode 32,
U2=the output voltage,
U3=the voltage at the diode 31,
U4=the voltage at the resistor 12,
U5=the voltage at the base-emitter path of the transistor 2,
U6=the voltage at the resistor 15, and
U7=the voltage at the decoupling diode 32.

*=the symbol for the multiplication $$I1 * R11 + U3 + U4 = U1 \quad (1)$$

$$(I3 + I2) * R11 = U3 + U4 = U1 \quad (2)$$

$$\frac{U7 - U5 + U2*b}{R13} + \frac{U4}{R12} * R11 + U3 + U4 = U1 \quad (3)$$

b is defined as $$b = \frac{R15}{R14 + R15} \quad (4)$$

On the basis of appropriate dimensioning, $$R11 = R13 \text{ is selected.} \quad (5)$$

Employment of identical transistors for the diode 31 and the transistor 2 yields:

$$U3 = U5 \quad (6)$$

The regulator 5 regulates the output voltage U2 to a constant value, resulting in $$U4 = U_{Ref} \quad (7)$$

being achieved.
The figure also shows that $$U1 = U2 + U7. \quad (8)$$

$$U7 + U2 * b + U4 * \frac{R13}{R12} + U4 = U1 \quad (9)$$

follows from (3), (5) and (6) with (8).

$$U2b + U4 * \frac{R13}{R12} + U4 = U2 \quad (10)$$

yields $$U2 = U4 * \frac{1 + \frac{R13}{R12}}{1 - b} \quad (11)$$

resolved for U2.

As the result of (11) shows, the influence of the semiconductors drops out. The temperature-dependent and current-dependent disturbance U7 is entirely eliminated and the disturbances U3 and U5 are eliminated in a first approximation.

The condition U3=U5 assumed for a complete compensation is achieved by the use of identical transistors as transistors 31 and 32. These transistors are preferably thermally closely coupled as SMD components.

The resistance ratio R14:R15 is expediently selected taking an optimum collector-emitter voltage for the transistor 2 into consideration.

The circuit arrangement is especially suited for output voltages U2 in the range from approximately 3.8 volts through 9 volts.

The lower limit values $U_{min}$ derives from $$U_{min} = U11 + U3 + Uce2 + U13 - U7$$

$$U_{min} = 1,0V + 0.7V + 1.3V + 1.2V + 0.4V = 3.8V.$$

whereby
U11 is the voltage at the resistor 11,
U13 is the voltage at the resistor 13, and
$U_{ce2}$ is the collector-emitter voltage of the transistor 2.

When the power supply unit 72 is in operation but the power supply unit 71 is not, then the voltage U4 is allowed to be U4=0.
This means that $$U2 - U3 - U3bo2 - U2*b = 12*(R11 + R12) = 0.$$

The voltage Uebo2 is the inhibit voltage of the emitter-base diode of the transistor 2. Given type BCX 70 this amounts to 5 volts.

In a preferred dimensioning example, the transistors 31 and 2 are of type BCX 70. The resistance ratio R 14:R 15 is selected such that the voltage at the tap 85 of the voltage divider formed by resistors 14 and 15 amounts 1.8 volts. The division ratio b=0.38.
Therefore, $$U6_{max} = (0.6v + 5v)/1 - 0, 38) = 9v$$

With the assistance of this circuit arrangement, the dependability of the systems is which it is used, particularly in systems for communications technology, can be enhanced by redundantly operating the power supply units are redundantly operated. The output circuits of the power supply units supplying the system are thereby applied to a common busbar via decoupling diodes. Although a high precision (or low tolerance) of, for example, ±2% is required for the voltage at this busbar given a low absolute value, for example 4.8 volts, and the range of Icad current is relatively large, for example extending from 0 through 8 A, one of the two power supply units can spell the other substantially without delay.

The unit connected first, for example 72, defines the voltage at the busbar 6. The measured value supplied by the ohmic voltage divider, however, is not present at the input of the regulator 4 of the unit 71 that has not yet been switched on as a consequence of the inhibit effect of the collector-base, or emitter-base, path of the transistor 2. No problem arises upon cut-in of the unit 71. The actual value based on the voltage U2 is not immediately offered to the regulator 4. The actual value former 5 can only operate when the voltage U12 has arrived in the proximity of its nominal value.

The power supply unit 71 can start up and generate the required voltage. The unit 71 can therefore achieve the correct operating condition without further difficulty.

The circuit arrangement is especially suited for redundant feed of devices in electrical communications technology.

Although modifications and changes may be suggested by those skilled in the art, it is the intention of the inventor to embody within the patent warranted hereon all changes and modifications as reasonably and properly come within the scope of his contribution to the art.

I claim as my invention

1. A circuit arrangement for generating a d.c. voltage regulated to a constant value comprising:
    two output terminals connectable to an electrical load, each output terminal having
        a current path leading thereto and said output terminals having an output voltage thereacross;
    means for forming an actual value at an output thereof;

regulator means for generating an adjustment voltage for compensating deviations of said output voltage from said actual value, said regulator means having an actual value input connected to said output of said means for forming an actual value, and a reference potential terminal;

said means for forming an actual value including an ohmic voltage divider, having a tap, connected across said output terminals, a transistor having a collector-emitter path and a base, said base connected to said tap, a parallel circuit having a first branch containing a first resistor and a second branch containing said collector-emitter path of said transistor and a second resistor connected in series, said parallel circuit being connected across said actual value input and said reference potential terminal of said regulator means with said first branch connected to said reference potential terminal via a first circuit node and said second branch connected to said reference potential via a second circuit node, and a third resistor connected in series across one of said output terminals and said actual value input of said regulator means with a diode polarized in a conducting direction with respect to said output voltage; and a decoupling diode, connected in the current path for the other of said output terminals, between said reference potential terminal of said regulator means and said other of said output terminals, said decoupling diode being connected between said first and second circuit nodes.

2. A circuit arrangement as claimed in claim 1 wherein said diode connected with series with said third resistor comprises a bipolar transistor having a base and a collector connected together.

3. A circuit arrangement as claimed in claim 2 wherein said transistor in said second branch of said parallel circuit and said bipolar transistor respectively comprise transistors of the same type.

4. A circuit arrangement as claimed in claim 2 wherein said transistor in said second branch of said parallel circuit and said bipolar transistor respectively comprise thermally closely coupled transistors.

5. A circuit arrangement as claimed in claim 1 wherein said second resistor and said third resistor respectively comprise resistors having the same resistance.

* * * * *